(No Model.)
G. W. THOMPSON.
OYSTER OPENING IMPLEMENT.
No. 408,939. Patented Aug. 13, 1889.
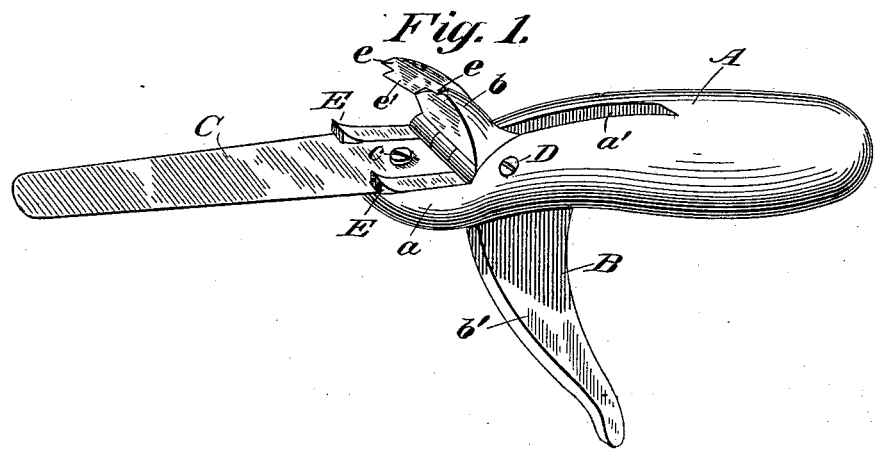
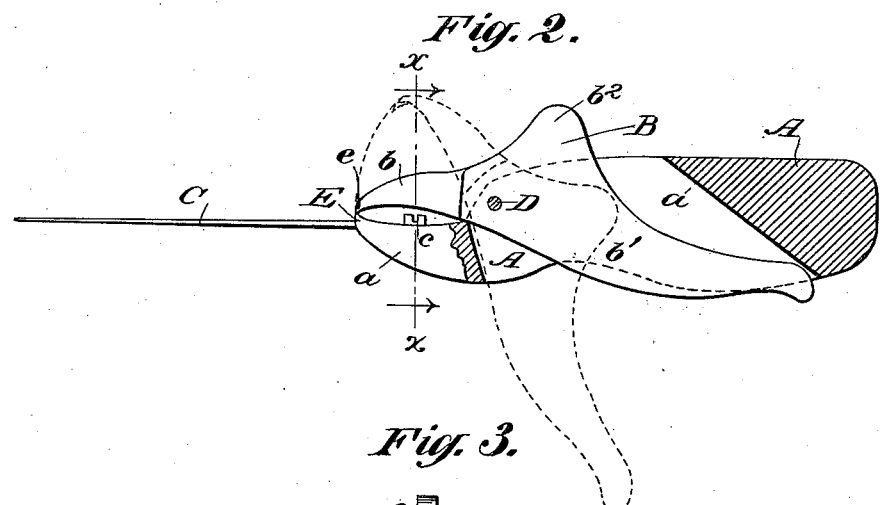
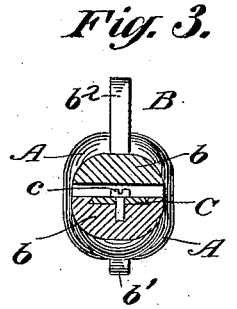
WITNESSES:
INVENTOR
G. W. Thompson
BY
ATTORNEY

United States Patent Office.

GEORGE W. THOMPSON, OF SAG HARBOR, NEW YORK.

OYSTER-OPENING IMPLEMENT.

SPECIFICATION forming part of Letters Patent No. 408,939, dated August 13, 1889.

Application filed May 4, 1889. Serial No. 309,588. (No model.)

*To all whom it may concern:*

Be it known that I, GEORGE W. THOMPSON, of Sag Harbor, in the county of Suffolk and State of New York, have invented a new and Improved Oyster-Opening Implement, of which the following is a full, clear, and exact description.

My invention relates to an implement more especially designed for opening oysters or other shell-fish easily and quickly and in a cleanly manner; and the invention has for its object to provide a simple, inexpensive, efficient, and durable tool of this character.

The invention consists in certain novel features of construction and combinations of parts of the implement, all as hereinafter described and claimed.

Reference is to be had to the accompanying drawings, forming a part of this specification, in which similar letters of reference indicate corresponding parts in all the views.

Figure 1 is a perspective view of my improved oyster-opening implement, with the jaws open. Fig. 2 is a side view thereof, with the handle partly broken away and in section, and with the jaws closed; and Fig. 3 is a cross-section through the jaws of the tool and taken on the line $x\ x$ in Fig. 2.

This implement is made with two levers A B, pivoted together near one end, and a blade or knife C, held to the short arm of one of the levers, preferably the one A, and projecting forward from the end of the short arm of said lever. The lever A is formed as a suitable handle or stock, which is preferably made of metal, either solid or perforated or hollow to lighten it, and may be securely and comfortably grasped by the hand of the operator, and is provided with a slot $a'$, into which the thinner rear or handle portion $b'$ of the other lever B is fitted loosely. Both levers are pivoted together by a screw D, and forward of this screw their short arms are formed as pincher-like jaws $a\ b$, respectively, which are adapted to be closed upon the end of the shell of an oyster or a clam or other shell-fish to break it off. The blade or knife C is preferably fitted to the jaw $a$ of the handle-lever A by an undercut or dovetail-shaped joint, (clearly shown in Fig. 3 of the drawings,) and a screw or pin $c$, passed through the blade into the jaw, prevents endwise slipping of the knife therefrom.

At each edge of the knife where it is fitted into the jaw $a$, the latter is preferably provided with a tooth or projection E, and both these projections E E—one at each edge of the knife—are directly opposite teeth $e\ e$ on the jaw $b$, which between its teeth $e\ e$ is provided with a larger central tooth or cutter $e'$, which is adapted to close onto the blade C between the side teeth $e\ e$ when the jaws are shut, at which time the teeth $e$ close onto the teeth E. When the jaws are closed upon the end of the shell of an oyster, the teeth E $e'$ first cut or crush through the shell and facilitate the biting off of the shell by the two jaws, to make an opening through which the knife-blade C may be entered.

I make the lever B with a projection $b^2$ at its upper edge and behind the pivot-joint of the two levers or jaws, to facilitate the opening of the jaws by the thumb of the hand grasping the tool, should it be preferred to operate it in this manner; but the long arm of the lever B normally overbalances its jaw $b$, and it will therefore automatically swing down on the pivot to open the jaws to receive the oyster or clam shell between them.

The operation of the implement is very simple and effective, and as follows: The tool will be grasped by the long arm of the lever A, as a handle, and so that the lever B may be easily worked by the same hand. The oyster-shell will then be placed at one end between the jaws, and they will be closed upon the shell to bite off its end, which is very easily done, and the knife-blade will then be entered into the split or opening made between the halves of the shell, cutting the eye of the oyster from the shell, as will readily be understood.

It will also be noticed that the detachable connection of the knife-blade C allows it to be removed at will for repair or renewal or to allow the implement to be packed away in smaller space, if desired.

Having thus described my invention, what I claim as new, and desire to secure by Letters Patent, is—

1. An oyster-opening implement consisting of two pivoted levers forming a handle and two pincher-like jaws and a knife or blade held detachably to one of the jaws, substantially as herein set forth.

2. The combination, in an oyster-opening implement, of two pivoted levers forming a handle and two pincher-like jaws and a knife or blade held detachably to one jaw, which has projections or teeth next the blade, substantially as herein set forth.

3. The combination, in an oyster-opening implement, of two levers A B, pivoted together at D and providing a handle and two jaws $a\ b$, and a blade C, held detachably to the jaw $a$, which has teeth E E next the blade, substantially as herein set forth.

4. The combination, in an oyster-opening implement, of two levers A B, pivoted together at D and providing a handle and two jaws $a\ b$, and a blade C, held to the jaw $a$, said jaw $a$ having teeth E E, and the jaw $b$ having teeth $e\ e\ e'$, substantially as herein set forth.

GEORGE W. THOMPSON.

Witnesses:
HENRY J. HARPER,
CLARENCE T. PRATT.